United States Patent Office 3,506,721
Patented Apr. 14, 1970

3,506,721
NUCLEAR VINYLATION OF PHENOLS
Joseph T. Arrigo, Mount Prospect, Ill., assignor to Universal Oil Products Company, Des Plaines, Ill., a corporation of Delaware
No Drawing. Continuation-in-part of application Ser. No. 230,713, Oct. 15, 1962. This application Aug. 29, 1966, Ser. No. 575,549
Int. Cl. C07c 39/18
U.S. Cl. 260—613  8 Claims

ABSTRACT OF THE DISCLOSURE

A process for nuclear vinylation of phenols in which a phenolic compound, such as phenol, is reacted with an N - (2,2 - dihydrocarbylethylidene) - 2, 2 -dihydrocarbylvinylamine, such as N-(2,2-dimethylethylidene)-2,2-dimethylvinylamine to yield a (2,2-dihydrocarbylvinyl) phenol such as O-(2,2-dimethylvinyl)phenol, which is useful as a rubber antiozonant.

This invention relates to a process for the nuclear vinylation of phenols, and in particular to a new and useful process for the preparation of (2,2-dihydrocarbylvinyl)phenols. Said phenols are generally useful in the preparation of polymers and copolymers, and also as organic intermediates in the preparation of detergents and corrosion inhibitors, and, in certain cases, as antioxidants, antiozonants, bactericides, fungicides, insecticides and photoantioxidants for solid polyolefins. For example, o-(2,2-dimethylvinyl)phenol is useful as a rubber antiozonant. This application is a continuation-in-part of a copending application Ser. No. 230,713 filed Oct. 15, 1962, now abandoned.

Previously, (substituted-vinyl)phenols have been prepared by devious methods. One such method involves the catalytic cracking of 2,2-bis(p-phenol) propane to give phenol and the desired p-(1-methylvinyl)phenol. Another method comprises the condensation of phenol and 2-methylallyl chloride to give the 2-methylallyl phenyl ether, followed by the application of heat to effect the migration of the substituted allyl group to form the o-methylallyl derivative of phenol (Claisen rearrangement). The latter phenol is thereafter isomerized to the desired (2,2-dimethylvinyl)phenol by the application of heat and in the presence of a catalyst.

It is an object of this invention to present a simplified process for the preparation of a (2,2-dihydrocarbylvinyl)phenol which embodies a novel nuclear vinylation reaction. In one of its broad aspects this invention embodies a process for the preparation of a (2,2-dihydrocarbylvinyl)phenol which comprises reacting a phenol and an N-(2,2-dihydrocarbylethylidene)-2,2-dihydrocarbylvinylamine at a temperature of from about 100° C. to about 300° C.

Another embodiment of the present invention is in a process for the preparation of a (2,2-dialkylvinyl)phenol which comprises reacting a phenol and an N-(2,2-dialkylethylidene)-2,2-dialkylvinylamine at a temperature of from about 100° C. to about 300° C.

Still another embodiment of the present invention is in a process for the preparation of a (2,2-dimethylvinyl) phenol which comprises reacting a phenol and N-(2,2-dimethylethylidene)-2,2-dimethylvinylamine, also known as N-isobutylidene-2-methylpropenylamine, at a temperature of from about 100° C. to about 300° C.

Other objects and embodiments of the present invention will become apparent in the following detailed specification.

In accordance with the process of the present invention a phenol is reacted with a N-(2,2-dihydrocarbylethylidene)-2,2-dihydrocarbylvinylamine to yield a (2,2-dihydrocarbylvinyl)phenol. Phenols which can be treated in accordance with the process of this invention include fused-ring polycyclic phenols comprising up to about 4 condensed benzene nuclei, for example, 1-naphthol, 2-naphthol, 1-hydroxyanthracene, 2-hydroxyanthracene, 9 - hydroxyanthracene, 2 - phenanthrol, 3 - phenanthrol, 4-phenanthrol, 9-phenanthrol, 1-hydroxypyrene, 3-hydroxypyrene, 4-hydroxypyrene, 1-hydroxychrysene, 2-hydroxychrysene, 3 - hydroxchrysene, 4 - hydroxychrysene, 5-hydroxychrysene, 6-hydroxychrysene, 1-hydroxynaphthacene, 2-hydroxynaphthacene, 9-hydroxynaphthacene, etc. Suitable phenols may further comprise a carbocyclic and/or heterocyclic ring condensed with the benzene nucleus or condensed benzene nuclei thereof as in the case of indanols, ar-tetralols, hydroxyquinolines, hydroxybenzofurans, hydroxycoumarans, hydroxychromans, hydroxybenzothiophenes, and the like. The phenols of this invention further include the polyhydric phenols, for example, dihydric phenols such as 1,2-dihydroxybenzene, 1,5-dihydroxynaphthalene, 1,2-dihydroxyanthracene, 1,2-dihydroxyphenanthrene, 3,4 - dihydroxypyrene, 1,2-dihydroxychrysene, etc., including the various position isomers thereof, for example, 1,3-dihydroxybenzene, 1,4-dihydroxybenzene, etc. Additional polyhydric phenols comprising more than two hydroxyl substituents, and particularly fused-ring polynuclear polyhydric phenols, are also subject to treatment in accordance with the present process. It is generally preferred to employ a polyhydric phenol comprising at least one benzene nucleus containing not more than three, and preferably not more than two, hydroxyl substituents attached to the same benzene nucleus. Such polyhydric phenols include 1,4,5-trihydroxynaphthalene, 1,4,5,8-tetrahydroxynaphthalene, 1,2,5-trihydroxyanthracene, 1,2,8-trihydroxyanthracene, 1,2,6-trihydroxyanthracene, 3,4,5-trihydroxyphenanthrene, and the like.

The above-described phenols may further comprise one or more substituent groups which are substantially inert under reaction conditions and substituted on the benzene nucleus or condensed benzene nuclei thereof provided that said benzene nucleus or condensed benzene nuclei contains a labile hydrogen atom in ortho and/or para position to a hydroxy substituent. For example, a suitable phenol may further comprise an alkyl, cycloalkyl, alkenyl, cycloalkenyl, aralkyl, alkaryl, aralkenyl, aryl, alkoxy, aryloxy, alkenoxy, diarylamino, arylalkylamino, dialkylamino, dialkylaminoalkyl, arylazo, hydroxyalkyl, alkoxyalkyl, aryloxyalkyl, alkenoxyalkyl, alkylmercapto, alkenylmercapto, arylmercapto, carboalkoxy, carbamyl, arylsulfinyl, arylsulfonyl, alkylsulfinyl, alkylsulfonyl, etc., substituent containing up to about 20 carbon atoms, and also cyano, formamido, acylamido, sulfonamido, halo, nitro, and the like substituents. Examples of the last-mentioned nuclear-substituted phenols include the ortho, meta, and para isomers of methylphenol, ethylphenol, cyclopentylphenol, allylphenol, cyclopentenylphenol, benzylphenol, vinylphenol, beta-styrylphenol, phenylphenol, methoxyphenol, pentoxyphenol, vinyloxyphenol, cyanophenol, N, N - diethylaminophenol, N,N - diethylaminomethylphenol, formamidophenol, acetamidophenol, ethoxymethylphenol, phenoxymethylphenol, vinyloxymethylphenol, ethylmercaptophenol, vinylmercaptophenol, sulfonamidophenol, chlorophenol, nitrophenol, carbomethoxyphenol, and the like. Also included are the xylenols, hydroxyazobenzene, 8-hydroxyquinoline, 2,2-bis(p-phenol)propane, thymol and the like.

Also considered within the scope of this invention are phenols comprising two of the same or different monohydric, polyhydric, and polycyclic phenols, above described, wherein the aryl moieties thereof are linked through an alkylene, alkylidene, or cycloalkylidene group, or through the sulfur atom of a sulfinyl or sulfonyl group, or through a sulfur or oxygen atom, or a nitrogen atom which may be further attached to an alkyl or an acyl group.

It is to be understood that the above enumerated compounds are merely representative of a class of phenols included in the generally broad scope of this invention which is not necessarily limited thereto.

The selected phenol is reacted with a N-(2,2-dihydrocarbylethylidene)-2,2-dihydrocarbylvinylamine to yield a 2,2-dihydrocarbylvinyl derivative of said phenol. The N-(2,2-dihydrocarbylethylidene) - 2,2 - dihydrocarbylvinylamine may be represented by the general structural formula

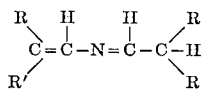

wherein R is a hydrocarbyl radical independently selected from the group consisting of alkyl, cycloalkyl, alkenyl, cycloalkenyl, aryl, aralkyl, and alkaryl, containing up to about 15 carbon atoms. The two R groups attached to the same carbon atom may together form a carboxylic ring containing up to about 12 carbon atoms. Suitable N-(2,2-disubstituted-ethylidene) - 2,2 - disubstituted vinylamines thus include N-(2,2-dimethylethylidene)-2,2-dimethylvinylamine,
N-(2-methyl-2-ethylethylidene)-2-methyl-2-ethylvinylamine,
N-(2,2-diethylethylidene)-2,2-diethylvinylamine,
N-(2,2-dipropylethylidene)-2,2-dipropylvinylamine,
N-(2-methyl-2-propylethylidene)-2-methyl-2-propylvinylamine,
N-(2,2-dicyclopentylethylidene)-2,2-dicyclopentylvinylamine,
N-(2-methyl-2-cyclopentylethylidene)-2-mehtyl-2-cyclopentylvinylamine,
N-(2,2-dicyclohexylethylidene)-2-dicyclohexylvinylamine,
N-(2,2-divinylethylidene)-2,2-divinylvinylamine,
N-(2,2-dicyclopentenylethylidene)-2,2-dicyclopentenylvinylamine,
N-(2-methyl-2-allylethylidene)-2-methyl-2-allylvinylamine,
N-(2,2-diphenylethylidene)-2,2-diphenylvinylamine,
N-(2-methyl-2-phenylethylidene)-2-methyl-2-phenylvinylamine,
N-(2,2-dibenzylethylidene)-2,2-dibenzylvinylamine,
N-(2-methyl-2-benzylethylidene-2-methyl-2-benzylvinylamine,
N-(2,2-di-p-tolylethylidene)-2,2-di-p-tolylvinylamine, and the like.

The aforementioned N-(2,2-dihydrocarbylethylidene)-2,2-dihydrocarbylvinylamines can be prepared by any conventional or convenient process. One preferred method comprises reacting an aldehyde, which may be described as a 2,2-dihydrocarbylacetaldehyde, and ammonia to form a N,N' - bis(2,2 - dihydrocarbylethylidene) - 2,2-dihydrocarbylethylidenediamine which is thereafter treated at decomposition reaction conditions of temperature and pressure to yield the desired N-(2,2-dihydrocarbylethylidene)-2,2-dihydrocarbylvinylamine. The class of compounds herein described, as well as their precursors, the so-called hydroamides, have been known since 1881 when they were described by Lipp in Berichte, 14, 1746. Preparation, by passing an excess of gaseous ammonia through alpha-branched chain saturated aliphatic aldehydes containing at least 5 carbon atoms at 20-25° C., is described in U.S. Patent 2,319,848 issued to Clark and Wilson. The particular compounds utilized during the course of the present work were prepared in accordance with the method of Hasek, Elam and Martin, Journal of Organic Chemistry, 26, 1822 (1961). For example, isobutyraldehyde is reacted with aqueous ammonium hydroxide solution at about 17-24° C. to form N,N'-bis(2,2-dimethylethylidene)-2,2-dimethylethylidenediamine, also known as N, N' - diisobutylidene - 2 - methyl - 1,1 - propanediamine, which is thereafter decomposed to yield the desired N-(2,2-dimethylethylidene)-2,2-dimethylvinylamine. The hydrocarbyl substituent groups of the aforementioned 2,2-dihydrocarbylacetaldehyde correspond to the hydrocarbyl substituent groups of the desired (2,2-dihydrocarbylvinyl) phenol product. A more detailed preparation is described in the examples appended hereto.

Reaction conditions relate principally to temperature. Pressure does not appear to be an important variable with respect to the present process and may be merely such as is necessary to effect a process flow in a continuous flow type of process, or autogenous pressure developed during the course of the reaction. A reaction temperature of from about 100° C. to about 300° C. is suitable at more extended reaction periods, say from about 1 hour to about 24 hours, although it is contemplated that a higher temperature may be employed in conjunction with a shorter reaction period or, vice versa, depending in part upon the particular reactants utilized. In general, it is preferred to conduct the process of this invention at a temperature of from about 150° C. to about 250° C. over a reaction period of from about 2 to about 4 hours.

The reaction of a phenol and a N-(2,2-dihydrocarbylethylidene)-2,2-dihydrocarbylvinylamine as herein described, surprisingly results in the substitution of a 2,2-dihydrocarbylvinyl group, or groups, on the aromatic nucleus of the phenol. Although the 2,2-hydrocarbylvinyl substituent enters predominantly in a position ortho to the phenolic hydroxyl group, para substitution also occurs. If both ortho positions are occupied, by a 2,2-dihydrocarbylvinyl group or other substituent, para entry can still occur.

Nuclear vinylation of phenols in the manner herein contemplated results in the evolution of one mole of ammonia per mole of N-(2,2-dihydrocarbylethylidene)-2,2-dihydrocarbylvinylamine reacted. The ammonia is readily recovered and can be re-used in the preparation of further quantities of N-(2,2-dihydrocarbylethylidene)-2,2-dihydrocarbylvinylamine in the manner hereinbefore described. Stoichiometrically, the nuclear vinylation reaction requires a mole ratio of phenol to the N-(2,2-dihydrocarbylethylidene) - 2,2 - dihydrocarbylvinylamine of 2:1 in the case of monosubstitution. However, it is preferred to utilize an excess of the phenol reactant as a deterrent to excess polysubstitution or undesirable side reactions. A mole excess of from about 3 to 1 to about 4 to 1 has given good results. In many cases it is beneficial to employ an inert solvent or diluent, for example, a saturated hydrocarbon such as decane, dodecane, Decalin, Tetralin or the like, or an ether, polyether, alcohol, N,N-dialkylcarboxamide, etc., boiling in the desired range.

One preferred embodiment of the present invention relates to a process for the preparation of (2,2-dimethylvinyl)phenol which comprises reacting phenol and N-(2,2-dimethylethylidene)-2,2-dimethylvinylamine at a temperature of from about 150° C. to about 250° C.

In another preferred embodiment, 2-naphthol is reacted with N-(2,2-dimethylethylidene)-2,2-dimethylvinylamine at a temperature of from about 150° C. to about 250° C. to yield the desired (2,2-dimethylvinyl)-2-naphthol.

Another preferred embodiment is in a process for the preparation of (2,2-dimethylvinyl) - 4 - methoxyphenol which comprises reacting p-methoxyphenol and N-(2,2-dimethylethylidene)-2,2-dimethylvinylamine at a temperature of from about 150° C. to about 250° C.

Still another preferred embodiment is in a process for the preparation of (2-methyl-2-ethylvinyl)-catechol which comprises reacting catechol and N-(2-methylbutylidene)-2-methyl-2-ethylvinylamine at a temperature of from about 150° C. to about 250° C.

Yet another preferred embodiment of this invention relates to a process for the preparation of (2,2-dimethylvinyl)-4-chlorophenol which comprises reacting p-chlorophenol and N-(2,2-dimethylethylidene)-2,2-dimethylvinylamine at a temperature of from about 150° C. to about 250° C.

The process of this invention may be effected in any suitable manner and may comprise a batch or a continuous type of reaction. In the case of a batch type of reaction, a quantity of the starting materials comprising the selected phenol and the selected N-(2,2-dihydrocarbylethylidene)-2,2-dihydrocarbylvinylamine (and a suitable solvent, if desired) is charged to a reaction vessel and heated therein at reaction temperautre over a suitable reaction period which may be determined by the substantial abatement of the evolution of ammonia from the reaction mixture. The reaction vessel may be a closed vessel, or preferably an open vessel with an overhead reflux condenser. At the expiration of a suitable reaction period, the reaction mixture is cooled and distilled, preferably at reduced pressure, to yield the desired (2,2-dihydrocarbylvinyl)phenol.

The (2,2-dihydrocarbylvinyl)phenol may be prepared in a continuous type of process wherein the reactants are charged in a continuous stream to a reactor maintained at the proper reaction condtions. The reactor may be an unpacked vessel or coil, or it may contain an inert packing material such as glass chips or beads or the like. The reaction mixture is continuously withdrawn from the reactor at a rate which will insure an adequate residence time therein. The reactor effluent is distilled to recover the desired product, the ammonia being recovered overhead for reuse and the unreacted starting materials recycled for further use as a portion of the feed material.

The following examples are presented to further illustrate the process of this invention. Said examples are for the purpose of illustration only and are not intended as a limitation in any manner of the generally broad scope of this invention. In the nuclear vinylation reactions hereinafter presented, the reaction mixtures were homogeneous (no stirring was required) and reactions were carried out by merely refluxing the reactants at atmospheric pressure, using a condenser with an overhead line leading to a Dry Ice-acetone trap (for collecting the ammonia liberated) which was vented through a calcium chloride drying tube. Refluxing was continued until ammonia evolution had virtually ceased, after which the product was largely freed of the unreacted phenolic reactant by distillation through a Vigreux column, followed by redistillation of the product cuts through a Minical fractionation column. Product identification and distribution were obtained by gas-liquid chromatography, infrared and ultraviolet spectrophotometry, mass spectrometry and elemental and nuclear magnetic resonance analysis. Yields are based on 2 moles of (2,2-dihydrocarbylvinyl)phenol per mole of N-(2,2-dihydrocarbylethylidene)-2,2-dihydrocarbylvinylamine charged.

EXAMPLE I

A mixture of 113.7 g. (1.21 moles) of phenol and 38.0 g. (0.31 mole) of N-(2,2-dimethylethylidene)-2,2-dimethylvinylamine was heated under reflux at a temperature of 168–192° C. and for a period of about 2.2 hours. The reaction mixture was cooled and distilled at a reduced pressure. A 30 mole percent yield of the ortho isomer of (2,2-dimethylvinyl)phenol boiling at 78° C./3.4 mm. (M.P. 22–24° C.), and a 10 mole percent yield of the para isomer, boiling at 105° C./2.8 mm. (M.P. 58–60° C.), were recovered. The indices of refraction at 21° C. were respectively 1.5588 and 1.5659. In addition there was recovered a 4 mole percent yield of 2,6-bis(2,2-dimethylvinyl)phenol boiling at 96° C./0.6 mm., and a 4 mole percent yield of 2,4-bis(2,2-dimethylvinyl)phenol boiling at 96° C./0.4 mm.

EXAMPLE II

A mixture of 114.4 g. (0.94 mole) of 2,4-dimethylphenol and 31.5 g. (0.25 mole) of N-(2,2-dimethylethylidene)-2,2-dimethylvinylamine was heated under reflux at a temperature of 177–198° C. for a period of about 3 hours. The reaction mixture was cooled and distilled at a reduced pressure. A 50 mole percent yield of 2-(2,2-dimethylvinyl)-4,6-dimethylphenol boiling at 57° C./0.30 mm. was recovered. The refractive index at 22° C. was 1.5404. From the higher-boiling fractions, an 8% yield of white prisms melting at 77–79° C. was recovered by recrystallization. This product corresponds to the benzoxazine:

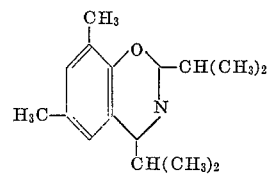

EXAMPLE III

A mixture of 65.2 g. (0.60 mole) of p-cresol and 37.8 g. (0.30 mole) of N-(2,2-dimethylethylidene)-2,2-dimethylvinylamine was heated under reflux at a temperature of 178–203° C. for about 3 hours. The reaction mixture was cooled and distilled at reduced pressure. A 38 mole percent yield of 2-(2,2-dimethylvinyl)-4-methylphenol boiling at 60° C./0.17 mm. was recovered. The refractive index at 21° C. was 1.5512. In addition, an 18 mole percent yield of 2,6-bis(2,2-dimethylvinyl)-4-methylphenol boiling at 86° C./0.20 mm. was recovered. The refractive index of the latter compound was 1.5548 at 21° C.

EXAMPLE IV

A mixture of 34.6 g. (0.31 mole) of catechol, 22.5 g. (0.15 mole) of N-(2-methyl-2-ethylethylidene)-2-methyl-2-ethylvinylamine and 58 g. of Decalin was refluxed for about 2 hours at 174–186° C. The reaction mixture was distilled and the solid, product-containing cuts were combined and purified by recrystallization followed by vacuum sublimation to yield a white crystalline solid melting at 80–83° C. which proved to be 3-(2-methyl-2-ethylvinyl)-catechol.

EXAMPLE V

A mixture of 58.7 g. (0.41 mole) of 2-naphthol, 25.2 g. (0.20 mole) of N-(2,2-dimethylethylidene)-2,2-dimethylvinylamine and 50 g. of Decalin was refluxed for about 2 hours at 205–218° C. The reaction mixture was distilled to yield 79% of a (2,2-dimethylvinyl)-2-naphthol (most probably the 1-isomer), B.P. 89° C./0.18 mm., M.P. of white prisms 61–62.5° C. after recrystallization. The lower-boiling cuts contained an additional 7% of product which had apparently undergone ring closure to yield the corresponding coumaran.

EXAMPLE VI

A mixture of 150 g. (1.21 moles) of 4-methoxyphenol and 38.5 g. (0.31 mole) of N-(2,2-dimethylethylidene)-2,2-dimethylvinylamine was refluxed for about 2.5 hours at 189–236° C. Distillation of the reaction mixture afforded a 37% yield of 2-(2,2-dimethylvinyl)-4-methoxyphenol, B.P. 73° C./0.2 mm. and refractive index 1.5624 at 22° C., along with 8% of 2,6-bis(2,2-dimethylvinyl)-4-methoxyphenol, B.P. 102° C./0.17 mm., refractive index 1.5610 at 22° C.

EXAMPLE VII

A mixture of 154.7 g. (1.20 moles) of p-chlorophenol and 38.4 g. (0.31 mole) of N-(2,2-dimethylethylidene)-

2,2-dimethylvinylamine was refluxed for about 2.3 hours at 195–225° C. Distillation of the reaction mixture afforded a 27% yield of 2-(2,2-dimethylvinyl)-4-chlorophenol, B.P. 67° C./0.45 mm., refractive index 1.5672 at 22° C., accompanied by about a 12% yield of product which apparently had undergone ring closure to yield what corresponds to 2,2-dimethyl-6-chlorocoumaran, B.P. 51° C./0.48 mm., refractive index 1.5354 at 22° C.

EXAMPLE VIII

A mixture of 122.7 g. (1.00 mole) of 3,5-dimethylphenol and 31.7 g. (0.25 mole) of N-(2,2-dimethylethylidene)-2,2-dimethylvinylamine was refluxed for about 3 hours at 184–223° C. Distillation of the reaction mixture afforded at 58% yield of 2-(2,2-dimethylvinyl)-3,5-dimethylphenol, B.P. 60° C./0.8 mm., refractive index 1.5372 at 22° C., along with an 11% yield of 2,6-bis(2,2-dimethylvinyl)-3,5-dimethylphenol, B.P. 91° C./1.0 mm., refractive index 1.5415 at 22° C.

EXAMPLE IX

A mixture of 130.1 g. (0.79 mole) of 2-t-butyl-4-methylphenol and 25.3 g. (0.20 mole) of N-(2,2-dimethylethylidene)-2,2-dimethylvinylamine was refluxed for about 3.3 hours at 194–214° C. Distillation of the reaction mixture afforded a 16% yield of 2-(2,2-dimethylvinyl)-4-methyl-6-t-butylphenol, B.P. 76° C./0.6 mm., refractive index 1.5228 at 21° C.

EXAMPLE X

A mixture of 106.9 g. (1.14 moles) of phenol and 45.8 g. (0.30 mole) of N-(2-methyl-2-ethylethylidene)-2-methyl-2-ethylvinylamine was refluxed for about 3.2 hours at 175–195° C. Distillation of the reaction mixture afforded a 33% yield of 2-(2-methyl-2-ethylvinyl)pheneol, B.P. 59° C./0.33 mm., refractive index 1.5505 at 22° C.; 12% of 4-(2-methyl-2-ethylvinyl)phenol, B.P. 88° C./0.35 mm., refractive index 1.5572 at 22° C. (solidifies on refrigeration); 5% of 2,6-bis(2-methyl-2-ethylvinyl)phenol, B.P. 102° C./0.35 mm. and 7% of 2,4-bis(2-methyl-2-ethylvinyl)phenol, B.P. 107–110° C./0.35 mm.

The subsequent examples relate to the preparation of the N - (2,2-dihydrocarbylethylidene)-2,2-dihydrocarbylvinylamine reactant.

EXAMPLE XI

In the preparation of N-(2,2-dimethylethylidene)-2,2-dimethylvinylamine, otherwise known as N-isobutylidene-2-methylpropenylamine, 715 grams of isobutyraldehyde was added to a stirred solution of 664 grams of concentrated ammonium hydroxide in 377 grams of water of a period of 1.5 hours. The reaction temperature was maintained at 17–24° C. When the isobutyraldehyde addition was completed, stirring was continued for an additional 1.5 hours at 20° C. The aqueous phase of the reaction mixture was then separated, ether extracted, and the ether extract was added to the organic phase of the reaction mixture. The organic phase was thereafter water-washed, dried over potassium hydroxide and vacuum distilled. About 609 grams of crude N,N'-bis(2,2-dimethylethylidene)-2,2-dimethylethylidenediamine, equivalent to a 94% yield, was recovered. A portion of the product was redistilled through a Minical column to yield a purified product boiling at 41° C. at 0.7 mm. (208° C. corrected to 760 mm.), with a refractive index of 1.4386 at 21° C. A 481 gram portion of this product was slowly distilled through a 24 inch column packed with wire mesh to yield 394 grams of N-(2,2-dimethylethylidene)-2,2-dimethylvinylamine boiling chiefly at 141–143° C., a heart-cut of which had a refractive index of 1.4595 at 22° C.

EXAMPLE XII

N-(2-methyl-2-ethylethylidene) - 2 - methyl-2-ethylvinylamine, otherwise known as N(2-methylbutylidene-2-methyl-1-butenylamine, was prepared by the procedure of Example XI using 8.28 moles of 2-methylbutyraldehyde.

About 540 grams of N,N'-bis(2-methylbutylidene)-2-methyl-1,1-butanediamine was recovered by vacuum distillation. Redistillation through a Minical column yielded product boiling at 259–265° C. (corrected to 760 mm.) having a refractive index of 1.4498-1.4540 at 21° C. A 435 gram sample of this product was pyrolyzed in the manner of Example XI to yield 369 grams of crude N-(2-methyl-2-ethylethylidene)-2-methyl - 2 - ethylvinylamine. On redistillation through a Hypercal column, a product boiling at about 189° C.—refractive index of 1.4650–1.4656 at 21° C.—was recovered.

I claim as my invention:

1. A process for preparing a (2,2-R,R'-vinyl) phenol, R and R' being hereinafter defined, which comprises reacting a phenol and an N-(2,2-dihydrocarbylethylidene)-2,2-dihydrocarbylvinylamine at a temperature of from about 100° C. to about 300° C., said phenol being selected from the group consisting of phenol and nuclearly substituted carbocyclic phenols in which the substituent group or groups is substantially inert under reaction conditions and is selected from the group consisting of hydroxy, halogen, nitro, cyano, formamido, sulfonamido and radicals containing up to about 20 carbon atoms selected from the group consisting of alkyl, cycloalkyl, alkenyl, cycloalkenyl, aralkyl, aralkenyl, aryl, alkoxy, alkenoxy, dialkylamino, dialkylaminoalkyl, alkoxyalkyl, aryloxyalkyl, alkenoxyalkyl, alkylmercapto, alkenylmercapto, carboalkoxy and acylamido, and said phenol being further characterized in that the benzene nucleus or condensed benzene nuclei thereof contains a labile hydrogen atom in an ortho and/or para position to a hydroxyl group; and said vinylamine having the following formula

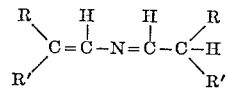

in which each R is the same and is hydrocarbyl containing up to about 15 carbon atoms and is selected from the group consisting of alkyl, cycloalkyl, alkenyl, cycloalkenyl, aryl aralkyl and alkaryl, and each R' is the same and is hydrocarbyl containing up to about 15 carbon atoms and is selected from the group consisting of alkyl, cycloalkyl, alkenyl, cycloalkenyl, aryl, aralkyl and alkaryl, R and R' being the same or different hydrocarbyl radicals.

2. The process of claim 1 further characterized in that said phenol is a hydroxybenzene.

3. The process of claim 1 further characterized in that said N - (2,2-dihydrocarbylethylidene)-2,2-dihydrocarbylvinylamine is an N-(2,2 - dialkylethylidene)-2,2-dialkylvinylamine.

4. The process of claim 3 further characterized in that said phenol is phenol and said N-(2,2-dialkylethylidene)-2,2-dialkylvinylamine is N-(2,2-dimethylethylidene)-2,2-dimethylvinylamine, and further characterized in that said temperature is a temperature of from about 150° C. to about 250° C.

5. The process of claim 3 further characterized in that said phenol is 2-naphthol and said N-(2,2-dialkylethylidene) - 2,2 - dialkylvinylamine is N-(2,2-dimethylethylidene)-2,2-dimethylvinylamine, and further characterized in that said temperature is a temperature of from about 150° C. to about 250° C.

6. The process of claim 3 further characterized in that said phenol is p-methoxyphenol and said N-(2,2-dialkylethylidene) - 2,2 - dialkylvinylamine is N-(2,2-dimethylethylidene)-2,2-dimethylvinylamine, and further characterized in that said temperature is a temperature of from about 150° C. to about 250° C.

7. The process of claim 3 further characterized in that said phenol is catechol and said N-(2,2-dialkylethylidene)-2,2 - dialkylvinylamine is N - (2 - methylbutylidene)-2-methyl-2-ethylvinylamine, and further characterized in that said temperature is a temperature of from about 150° C. to about 250° C.

8. The process of claim 3 further characterized in that said phenol is p-chlorophenol and said N-(2,2-dialkylethylidene) - 2,2 - dialkylvinylamine is N-(2,2-dimethylethylidene)-2,2-dimethylvinylamine, and further characterized in that said temperature is a temperature of from about 150° C. to about 250° C.

No references cited.

BERNARD HELFIN, Primary Examiner

U.S. Cl. X.R.

260—244, 465, 479, 609, 611, 619, 622, 623, 624, 625, 626